(12) United States Patent
Okubo

(10) Patent No.: US 10,462,313 B2
(45) Date of Patent: Oct. 29, 2019

(54) RESTORING STATE OF OPERATION IN AN IMAGE FORMING APPARATUS

(71) Applicant: SHARP KABUSHIKI KAISHA, Sakai, Osaka (JP)

(72) Inventor: Masanori Okubo, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/153,399

(22) Filed: Oct. 5, 2018

(65) Prior Publication Data

US 2019/0109956 A1    Apr. 11, 2019

(30) Foreign Application Priority Data

Oct. 6, 2017    (JP) .................. 2017-196102

(51) Int. Cl.
*H04N 1/00* (2006.01)
*H04N 1/44* (2006.01)

(52) U.S. Cl.
CPC ....... *H04N 1/00514* (2013.01); *H04N 1/0097* (2013.01); *H04N 1/00482* (2013.01); *H04N 1/4433* (2013.01); *H04N 2201/0094* (2013.01)

(58) Field of Classification Search
None
See application file for complete search history.

(56) References Cited

U.S. PATENT DOCUMENTS

| 2014/0029041 | A1* | 1/2014 | Okubo | H04N 1/4433 358/1.14 |
| 2017/0085730 | A1* | 3/2017 | Maeda | H04N 1/00482 |
| 2017/0171431 | A1* | 6/2017 | Towata | G06K 9/00268 |

FOREIGN PATENT DOCUMENTS

JP    2010-023451 A    2/2010

* cited by examiner

*Primary Examiner* — Andrew H Lam
(74) *Attorney, Agent, or Firm* — ScienBiziP, P.C.

(57) ABSTRACT

When unintended logout is made, printing conditions and a state of an operation screen at the time of the logout are stored. When a user logs in again after this, an image forming apparatus returns to a state before the logout based on the stored printing conditions and the stored state of the operation screen.

7 Claims, 12 Drawing Sheets

FIG. 3

| FINAL LOGOUT USER NAME | EMPLOYEE A |
|---|---|
| DISPLAY SCREEN INFORMATION | COPY SETTING SCREEN |
| PRINT SETTING INFORMATION | NUMBER OF COPIES    3<br>COLOR MODE    FULL COLOR<br>COPY CONCENTRATION    AUTOMATIC<br>MAGNIFICATION    100%<br>PAPER SHEET    AUTOMATIC<br>DOUBLE-SIDED COPY    ONE SIDE → ONE SIDE<br>SORT/GROUP    AUTOMATIC |

FIG. 4

| USER NAME | LOGIN DATE AND TIME | LOGOUT DATE AND TIME | LOGOUT METHOD |
|---|---|---|---|
| EMPLOYEE A | 2017/06/01 10:00:01 | 2017/06/01 10:04:22 | NORMAL |
| EMPLOYEE B | 2017/06/01 10:06:21 | 2017/06/01 10:08:04 | NORMAL |
| EMPLOYEE A | 2017/06/01 11:22:24 | 2017/06/01 11:29:24 | TIMEOUT |

RESTORING STATE OF OPERATION IN AN IMAGE FORMING APPARATUS

BACKGROUND

1. Field

The present disclosure relates to an image forming apparatus or the like having an image forming section for forming an image on a recording medium based on printing conditions.

2. Description of the Related Art

In recent image forming apparatuses, there are many apparatuses having a user authenticating function. Among such image forming apparatuses, from the viewpoint of security enhancement, there are apparatuses that ensure security by logging out automatically in a case where a user does not perform an operation for a certain period of time after logging in, and the like.

In addition, various functions are added to the image forming apparatus, and items to be set for each function are also diverse. Therefore, the number of operations necessarily used for setting conditions of printing or the like has also increased and has become complicated. However, when a certain period of time elapses during which no operation is being performed in the middle of setting the printing conditions, there is a case where the logout processing is unintentionally performed and the set condition is deleted by the logout processing. In such a case, it is requested to set the same condition again after logging in, which takes time and effort.

In response to such a problem, for example, an image forming apparatus is disclosed in which, in a case where there is no operation from the user for a predetermined period of time, the operation contents are saved when it is determined that the operation from the user is in the middle of the work, the operation is resumed in a state of being in the middle of the work when the user logs in again, and the operation contents saved as work completion are deleted when a start button for starting printing or when a confirm button for confirming the setting is pressed (for example, refer to Japanese Unexamined Patent Application Publication No. 2010-23451).

In a normal image forming apparatus, there are cases where different documents are read under the same conditions. For example, when a certain period of time has elapsed while printing a first document and setting a second document, there is a case where unintended logout is made. In this case, since it is determined that the printing of the first document is completed before the logout, the printing conditions are deleted when the user logs in again, and there is a problem that an initial screen is displayed. In other words, in a case of logging out while setting a new document on a document table after performing the scan, the initial screen is displayed when the user logs in again, and it takes time and effort to operate a panel until a copy function is used again.

SUMMARY

It is desirable to provide an image forming apparatus or the like capable of appropriately returning a state after a user logs in again in a case where the user is logged out without performing a logout operation.

According to an aspect of the present disclosure, there is provided an image forming apparatus having an image forming section that forms an image on a recording medium based on printing conditions, the apparatus including: a state determination unit that determines a state of the image forming apparatus; an authentication unit that authenticates a user and permits login of the user to the image forming apparatus; an operation display unit that is capable of displaying an operation screen that receives setting of the printing conditions by the user; a storage unit that stores the printing conditions and a state of the operation screen in a case where the user is logged out from the image forming apparatus without performing a logout operation by the user; and a returning unit that reads out the printing conditions and the state of the operation screen stored in the storage unit and returns to the state at the time of logout in a case where the user is logged out without performing the logout operation and the state determination unit determines that there is no change in the state of the image forming apparatus, when the authentication unit permits the login of the user.

According to another aspect of the present disclosure, there is provided a program executed in an image forming apparatus that forms an image on a recording medium based on printing conditions, the program including: a state determining function of determining a state of the image forming apparatus; an authenticating function of authenticating a user and permitting login of the user to the image forming apparatus; an operation display function of being capable of displaying an operation screen that receives setting of the printing conditions by the user; a storage function of storing the printing conditions and the state of the operation screen in a case where the user logs out from the image forming apparatus without performing a logout operation by the user; and a returning function of reading out the printing conditions and the state of the operation screen stored by the storage function and returning to the state at the time of logout in a case where the user is logged out without performing the logout operation and it is determined by the state determining function that there is no change in the state of the image forming apparatus, when the authenticating function permits the login of the user.

BRIEF DESCRIPTION OF THE DRAWINGS

FIG. 3 is a view illustrating an example of a data configuration of resume information according to the first embodiment;

FIG. 4 is a view illustrating an example of the data configuration of user log information according to the first embodiment;

DESCRIPTION OF THE EMBODIMENTS

Hereinafter, embodiments in a case where the image forming apparatus of the disclosure is applied will be described with reference to the drawings. In addition, as an image forming apparatus, for example, a digital multifunction machine is described as an example, but it is needless to say that a system, such as a printer connected to a computer, can also be realized.

1. First Embodiment 1.1 Overall Configuration

Figure 1:
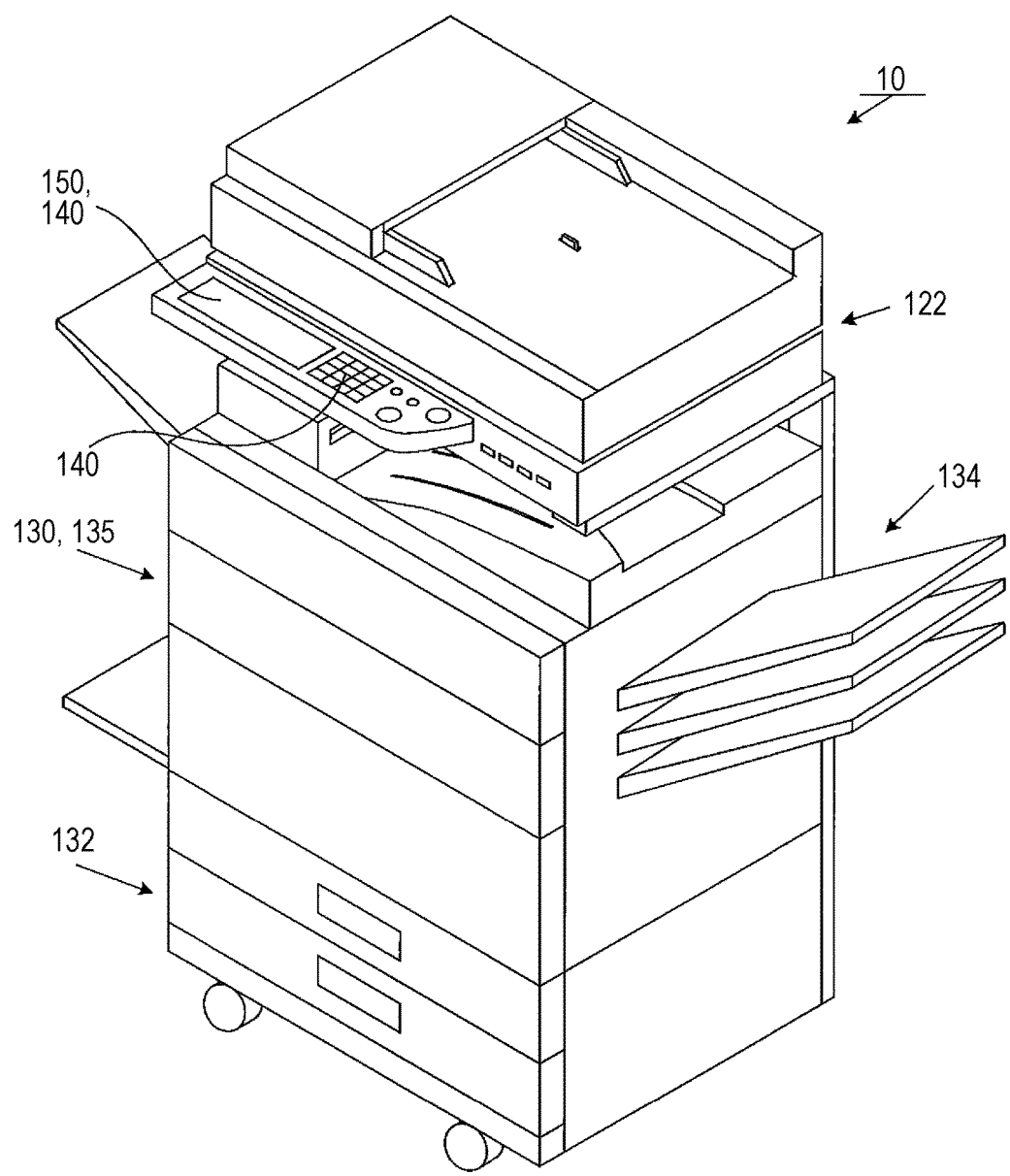
FIG. 1 is a view for describing the overall configuration of an image forming apparatus according to a first embodiment.
Figure 2:
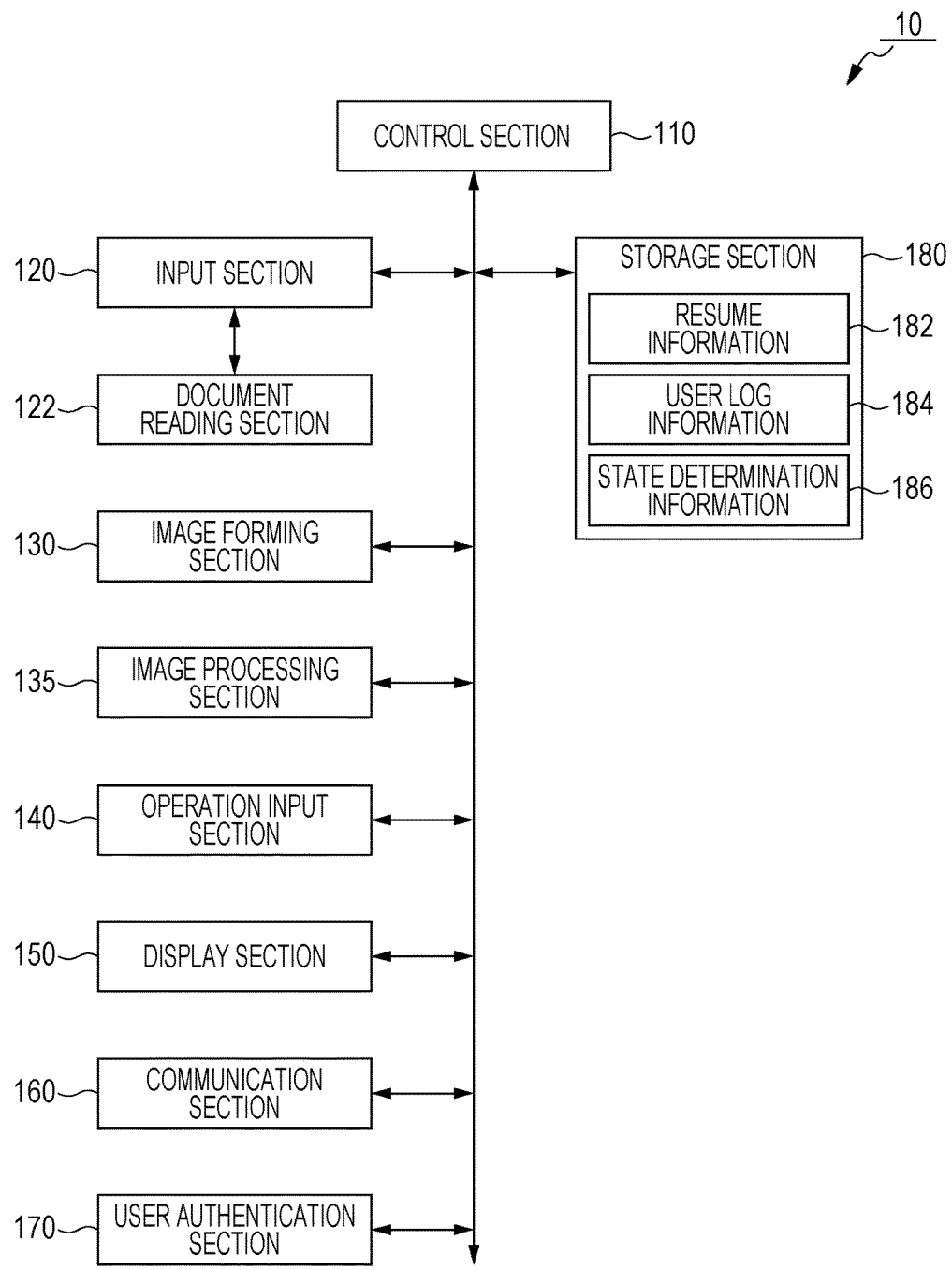
FIG. 2 is a view for describing a functional configuration of an image forming apparatus according to the first embodiment.

First, the overall configuration of an image forming apparatus 10 according to the embodiment will be described with reference to FIGS. 1 and 2. FIG. 1 is an external perspective view of the image forming apparatus 10, and FIG. 2 is a functional configuration view of image forming apparatus 10.

The image forming apparatus 10 includes a control section 110, an input section 120, a document reading section 122, an image forming section 130, an image processing section 135, an operation input section 140, a display section 150, a communication section 160, a user authentication section 170, and a storage section 180.

The control section 110 is a functional section for controlling the overall image forming apparatus 10. The control section 110 realizes various functions by reading out and executing various programs stored in the storage section 180, and is configured with, for example, a central processing unit (CPU).

The input section 120 is a functional section for receiving image data to be input to the image forming apparatus 10. The input section 120 is connected to the document reading section 122 which is a functional section for reading an image of a document, and receives the image data output from the document reading section 122. In addition, the input section. 120 may receive the image data from a storage medium, such as a USB memory or Compact Flash (registered trademark), or may input (receive) document data from another terminal via the communication section 160.

The document reading section 122 reads the image of the document, generates the image data, and outputs the image data to the input section 120. For example, the document reading section 122 is configured with a scanner device or the like provided with a device for converting optical information, such as a charge coupled device (CCD), into an electric signal.

The image forming section 130 is a functional section that forms the image data on a recording medium (for example, recording paper sheet). For example, the recording paper sheet is fed from a paper feed tray 132 in FIG. 1, and after an image is formed on the surface of the recording paper sheet in the image forming section 130, the paper is discharged from a paper discharge tray 134. The image forming section 130 is configured with, for example, a laser printer using an electrophotographic method or the like.

The image processing section 135 is a functional section that performs various image processing on the image data. For example, sharpening processing of the image data may be performed or color conversion processing may be performed.

An operation input section 140 is a functional section for instructing an operation a user who is an operator and instructing setting, and is configured with various key switches or a device for detecting input by touching. In addition, the display section 150 is a functional section for notifying the user of various types of information, and is configured with, for example, an LCD. In addition, a screen displayed on the display section 150 is referred to as an operation screen.

Here, in the embodiment, there is provided a touch panel in which the operation input section 140 and the display section 150 are integrally formed. As a method of detecting the input of the touch panel, a general detection method is used, and any method, such as a resistive film method, an infrared method, an electromagnetic induction method, or a capacitance method, may be used.

A communication section 160 is a functional section for communicating with other devices. For example, the communication section 160 is a functional section that can communicate via a wired LAN or a functional section that can communicate via a wireless LAN. The communication method may be Ethernet (registered trademark) or IEEE802.11a/b/g/n, or may be a communication network, such as ITE (registered trademark) communication network or WiMAX (registered trademark).

The user authentication section 170 is a functional section that authenticates the user (operator) who uses the image forming apparatus 10. As a method of user authentication, a general authentication method is used, and for example, an IC card reader reads user information stored in an ID card or the like, the user is authenticated based on the user information, and the user authentication is performed by password input. In addition, the user authentication may be performed using biometric information (for example, voice, vein, fingerprint, and retina), or the user authentication may be performed by an external authentication server.

A storage section 180 is a functional section in which various programs necessarily used for the operation of the image forming apparatus 10 or various pieces of data are stored. The storage section 180 is configured with, for example, a semiconductor memory, a hard disk drive (HDD), or the like.

In addition, in the storage section 180, resume information 182, user log information 184, and state determination information 186 are stored.

The resume information 182 will be described with reference to FIG. 3. The resume information 182 is information to be stored in a case where the user is unintentionally logged out, and is information for reproducing the state of the image forming apparatus 10 at the time of the previous logout when the user logs in again. In the resume information 182, the final logout user name (for example, "employee A") which is the name of the user who unintentionally logged out, display screen information (for example, "copy setting screen"), and print setting information. (for example, "the number of copies is 3 and a color mode is full color") are stored.

The display screen information is information indicating the status of the screen displayed on the display section 150 at time of logout. In the embodiment, the screen name is stored, but the ID assigned to each screen may be stored, or information, such as the type or the position of the displayed window, may be stored.

The print setting information is information indicating the printing conditions set in the image forming apparatus 10 at the time of the logout. In the embodiment, one or a plurality of setting items and the values thereof are stored in association with each other (for example, the setting item "the number of copies" is associated with the setting value "3" of the setting item).

The user log information 184 is information related on the user log related to login/logout in the image forming apparatus 10. As illustrated in FIG. 4, a login date and time (for example, "2017 06/01 10:00:01") of the user, a logout date and time (for example, "2017 06/01 10:04:22"), and a logout method (for example, "normal") are stored in the user name (for example, "employee A"). Here, the user name may store information, such as an account name or a user ID, for uniquely identifying the user.

The logout method is information indicating in which manner the user specified by the user name is logged out. The logout method is used to determine whether or not the previous logout was intended when the user of the image forming apparatus 10 logged in. In the embodiment, a character string for specifying the logout method is stored, but a flag as to whether or not the intended logout has been made may be stored.

In addition, in the embodiment, as the logout method, two types of logout methods including logout by pressing a logout button and logout due to timeout are applied. In addition, when the logout by pushing the logout button is set to be the intended logout, the logout due to timeout is set as logout which is unintended.

In addition, it is needless to say that the logout method is other than that of the description above. For example, there may be a logout method of logging out by transitioning to a power saving mode, a logout method by power off, or a logout method by interrupting by another user.

In addition, in the embodiment, a logout method is stored, but when there is no logout date and time without storing the logout method, it may be determined that the logout method was unintended.

The state determination information 186 is information used for determining whether or not the state of the image forming apparatus 10 matches the state at the time of logout and the state when the user logs in again. In the embodiment, the determination is performed based on the placed state of the document placed on the document reading section 122. In this case, in the state determination information 186, the image data of the document placed on the document reading section 122 at the time of logout may be stored, or a flag indicating whether or not the state of the document reading section 122 has changed during the logout is stored.

1.2 Flow of Processing

Next, the flow of processing in the embodiment will be described.

Figure 5:
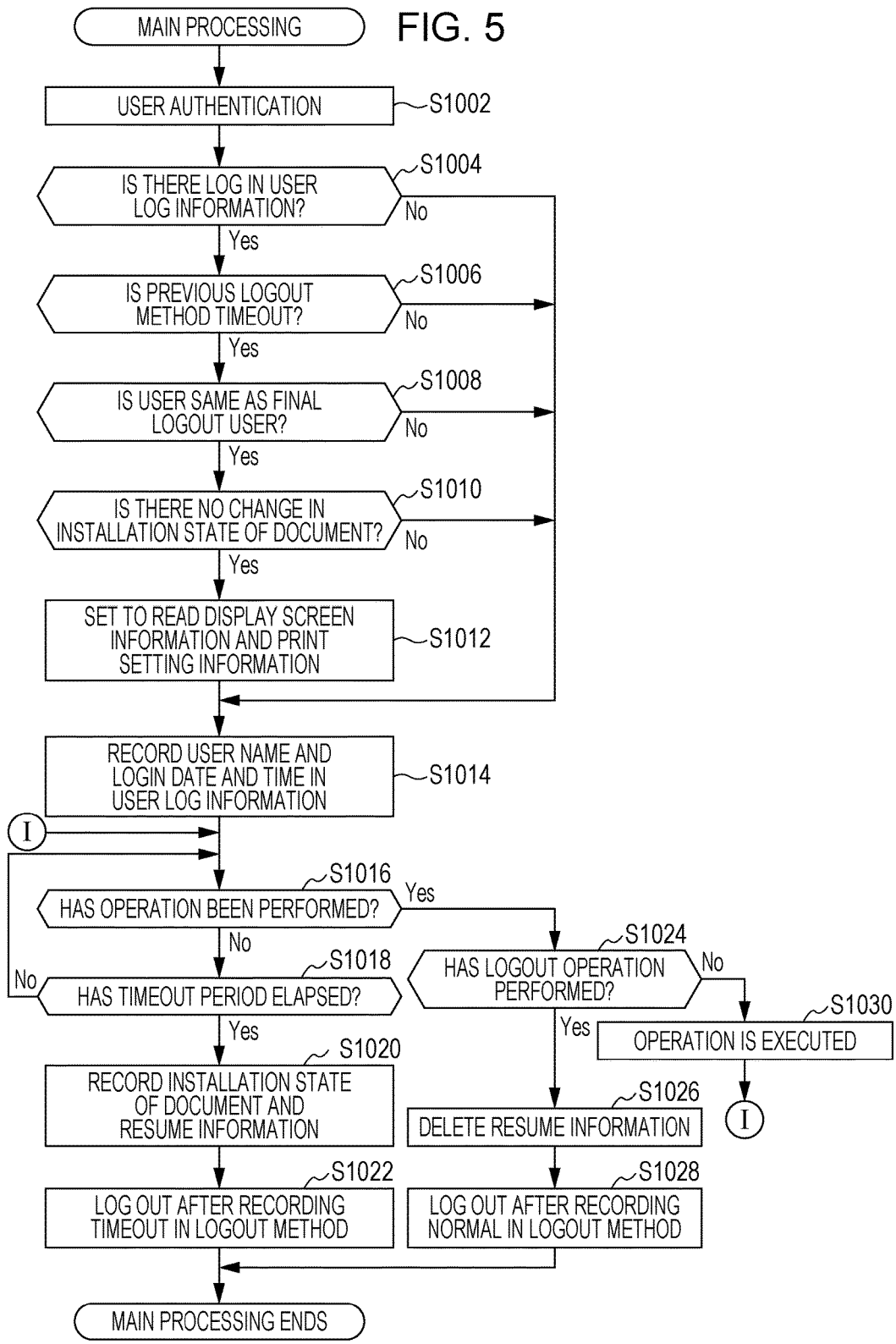
FIG. 5 is an operation flow for describing main processing according to the first embodiment.

FIG. 5 is a flowchart describing main processing of the image forming apparatus 10. First, user authentication is performed by the user authentication section 170 (step S1002). In a case where the user authentication is performed correctly (in a case where the login is permitted), it is subsequently determined whether to read the display screen information and the print setting information at the previous logout.

First, it is determined whether or not the user log of the authenticated user (currently logged-in user) is stored in the user log information 184 (step S1004). In a case where the user log is stored, it is determined whether or not the previous logout method of the user was logout due to timeout, that is, whether or not unintended logout is made (step 1004; Yes→step S1006). In the previous logout method, from the user log information 184, the logout method at the logout date and time closest to the current time may be referred to for the user. In addition, when it is determined that the unintended logout is made in a case where the logout time is not stored, the user log of the login date and time closest to the current time may be referred to for the user.

In a case where the logout is due to timeout, it is subsequently determined whether or not the currently logged-in user and the final logout user stored in the resume information 182 match each other (step S1006; Yes→step S1008). As described in the embodiment, in a case where the final logout user name is stored, the determination may be performed depending on whether the user name of the currently logged-in user matches the final logout user name.

Subsequently, it is determined whether or not there is a change in the placed state of the document from the previous logout (step S1008; Yes→step S1010). The placed state of the document refers to a state where the document is placed in the image forming apparatus 10, and in the embodiment, the placed state of the document refers to a state related to the document reading section 122, which is about whether or not the document is placed on the document reading section 122, and which is the type or the contents of the placed document in a case where the document is placed on the document reading section 122. Determination as to whether or not there is no change in the placed state of the document from the previous logout time is per based on the state determination information 186.

Here, various methods can be considered for determining whether or not the placed state of the document has changed, but for example, the following method can be applied.

(1) It is determined whether or not there is no change in the state of the document table or an automatic document feeder (ADF). For example, it is determined whether or not the document remains being placed on the document table, and whether or not the document remains being set in the automatic document feeder, from the unintended logout to the current login time.

(2) The image data of the document is stored in the state determination information 186, and it is determined whether or not the image matches the image data. For example, in step S1010, the document placed on the document reading section 122 is read, and it is determined whether or not the two pieces of image data of the image data of the document and the image data of the document stored in the state determination information 186 match each other. In a case where the two pieces of image data match each other, it is determined that there is no change in the placed state of the document. In addition, in the determination as to whether or not the two pieces of image data match each other in this case, even when the two pieces of image data do not completely match each other, a difference to the extent that the two pieces of image data are considered to match each other is permitted.

Subsequently, when there is no change in the placed state of the document, the display screen information and the print setting information stored in the resume information 182 are read and the setting of the image forming apparatus 10 is performed (step S1010; Yes→step S1012). Specifically, a display screen based on the read display screen information is displayed on the display section 150, and printing conditions are set based on the print setting information. Accordingly, the user can start the work again from the state of the image forming apparatus 10 at the time of the previous logout.

In addition, regarding a case where there is no log of the authenticated user in the user log information 184 (step S1004; No), a case where the previous logout method is not timeout (step S1006; No), a case where the final logout user name and the user name of the authenticated user do not match each other (step S1008; No), and a case where there is a change in the placed state of the document (step S1010; No), the display screen information and the print setting information are not set.

Subsequently, the currently logged in user and the login date and time are stored in the user log information 184 (step S1014).

Subsequently, it is determined whether or not the user has operated the image forming apparatus 10 (step S1016). When there is no operation, it is determined whether or not the timeout period has elapsed (step S1016; No→step S1018). In a case where the timeout period has not elapsed, the process returns to step S1016.

Here, the timeout time may be set by the user or may be preset. For example, in a case where "3 minutes" is set, and in a case where 3 minutes have elapsed, the user is forcibly logged out. In addition, since the timeout period is the time when the user logs out, for example, the timeout period may be the time to shift to a power saving mode, or the like.

In a case where the timeout period has elapsed, the placed state of the document is stored as the state determination information 186, and the resume information 182 is stored (step S1018; Yes→step S1020). As the placed state of the document, for example, information in which the document is placed on the document table or the document exists on the automatic document feeder is stored. Further, in a case of the document table, the document of the document reading section 122 may be read, and the image data to be compared in step S1010 may be stored in the state determination information 186. In addition, as the resume information 162, the display screen information at the time point, the print setting information, the user who is logged in, are stored.

Subsequently, the user log information 184 stores the logout date and time and a character string "timeout" as a logout method in association with the currently logged-in user, and performs the logout (step S1022). Accordingly, the main processing ends.

In addition, in step S1016, in a case where the user operates the image forming apparatus 10, it is determined whether or not the operation is a logout operation (step S1016; Yes→step S1024). The logout operation is an operation by which the user instructs the image forming apparatus 10 to log out. Specifically, for example, the logout operation is an operation of selecting the logout button.

In a case where the logout operation is a logout operation (step 1024; Yes), the resume information 182 is deleted (step S1026). In addition, the user log of the user log information 184 stores the logout date and time and a character string "normal" as a logout method in association with the currently logged-in user, and performs the logout (step S1028).

In a case where an operation other than the logout operation is per the operation is executed (step S1024; No→step S1030), and the process returns to step S1016.

Figure 6:
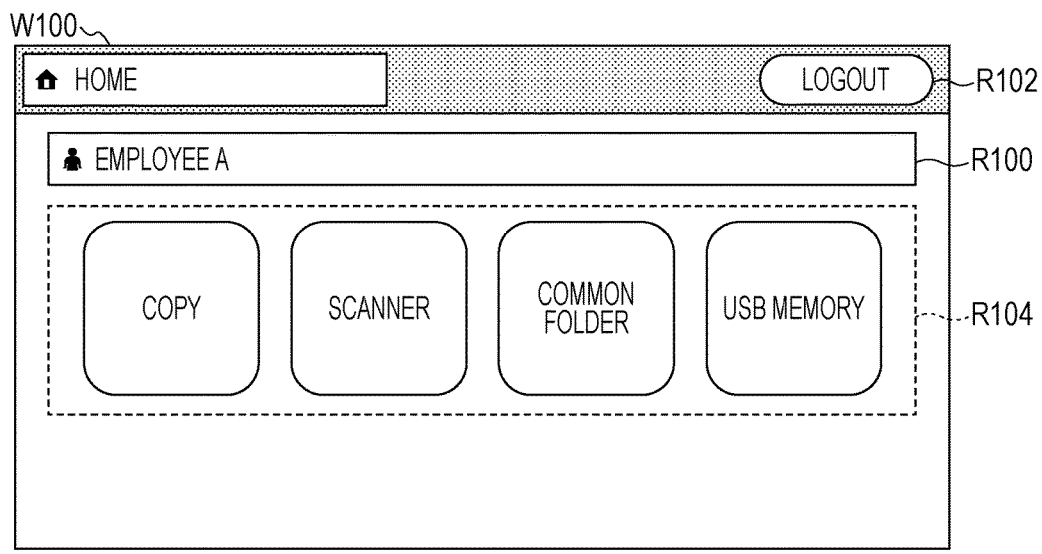
FIG. 6 is a view for describing as operation example of an initial screen according to the first embodiment.

A specific example of the display screen displayed on the display section 150 will be described with reference to FIGS. 6 to 9. FIG. 6 illustrates an example of the display screen (operation screen) W100 of the image forming apparatus 10. The display screen is displayed as an initial screen in the image forming apparatus 10, and the name of the logged-in user is displayed in a region R100. Further, the logout button is displayed in a region R102, and the intended logout can be made by the selection (for example, touch operation) of the user. In addition, in a region R104 therebelow, buttons for selecting which function of the image forming apparatus 10 is used are displayed. For example, as the "copy" button is touched, a copy mode operates. The screen is displayed in a case where the display screen information and the print setting information are not read out.

Figure 7:
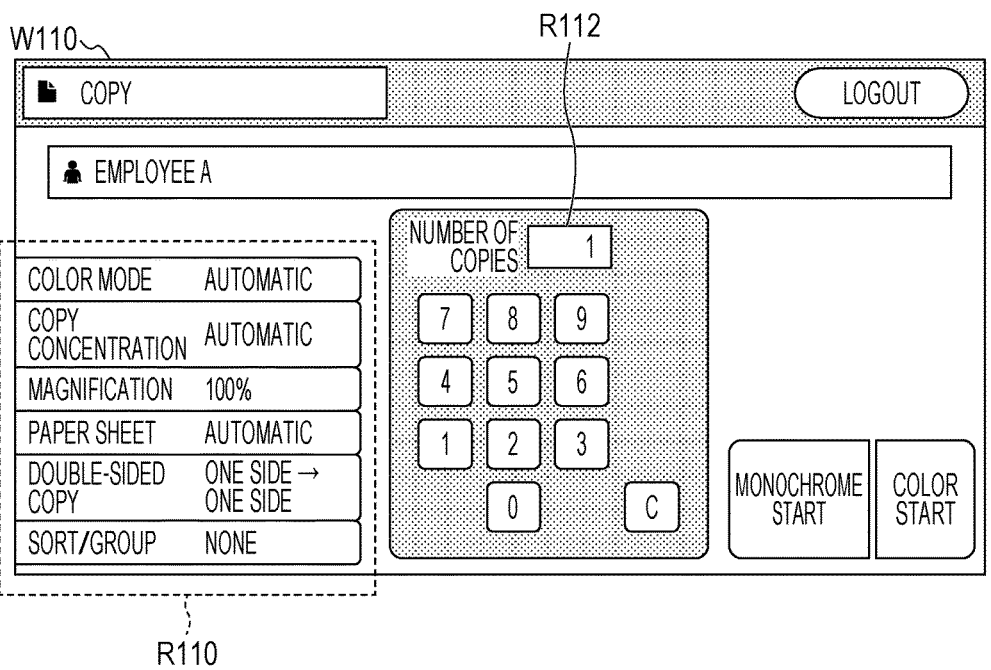
FIG. 7 is a view for describing an operation example of a print screen on which initial conditions are set according to the first embodiment.

FIG. 7 illustrates an example of a display screen W110 indicating the initial screen of the copy mode. In the display screen W110, initial conditions are set as printing conditions. In addition, the printing conditions are displayed in a region R110, and for example, a state where the color mode is set to "automatic", copy concentration is set to "automatic", sort/group is set to "none", and the like, is displayed.

In addition, the number of printing copies is displayed in region R112, and "1" is set in the drawing. From there, the user can set the printing conditions.

Figure 8:
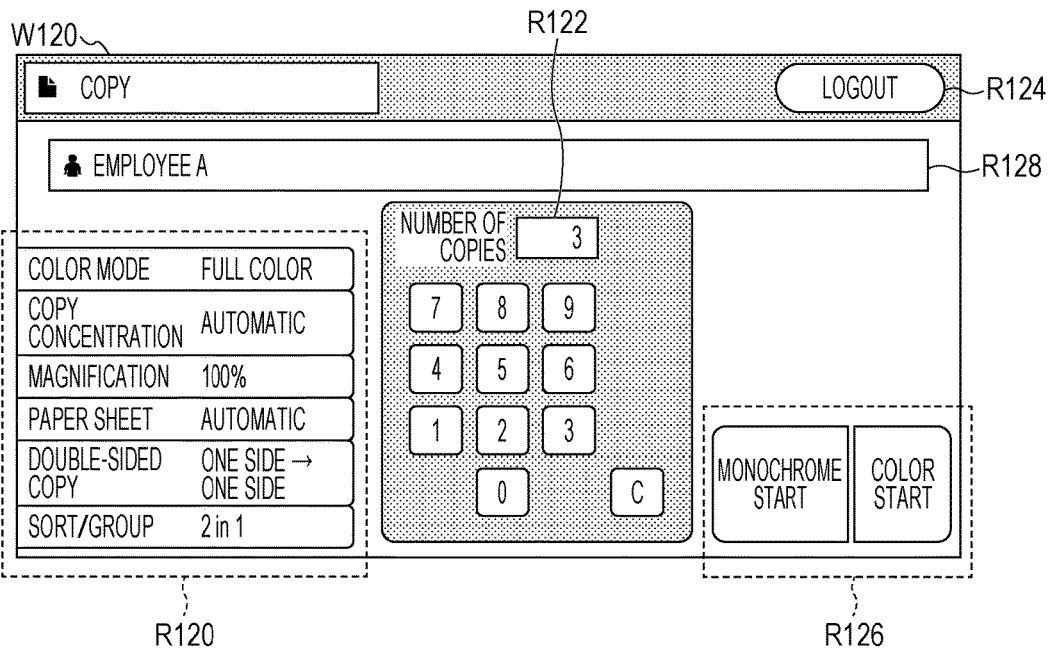
FIG. 8 is a view for describing an operation example of a screen based on print setting information according to the first embodiment.

FIG. 8 illustrates an example of a display screen W120 in a case where the user has set the printing conditions. The currently logged-in user is displayed in a region R128, and the set printing conditions are displayed in a region R120. For example, the initial conditions have been changed to "full color" in the color mode and "2 in 1" in the sort/group. In addition, in a region R122, the number of printing copies is displayed, but in the drawing the number has been changed to "3".

Here, when the user selects a copy start button (for example, a monochrome start button for executing monochrome copy or a color start button for executing color copy) displayed in a region R126, copying is performed according to the set printing conditions.

Further, when the logout button displayed in a region R124 is selected (for example, touch operation), the intended logout operation is performed for the user "employee A". In other words, the print setting information (and display screen information) is initialized.

However, in a case where the logout operation is not performed and the user is logged out due to timeout, the printing conditions are stored as the print setting information. In this case, in a case where the same employee A logs in and the placed state of the document is the same (there is no change), the print setting information is read and the printing conditions are set. While the screen returns on the display screen W110 of FIG. 7 in the related art, the screen returns on the display screen W120 of FIG. 8 in the embodiment.

Figure 9:
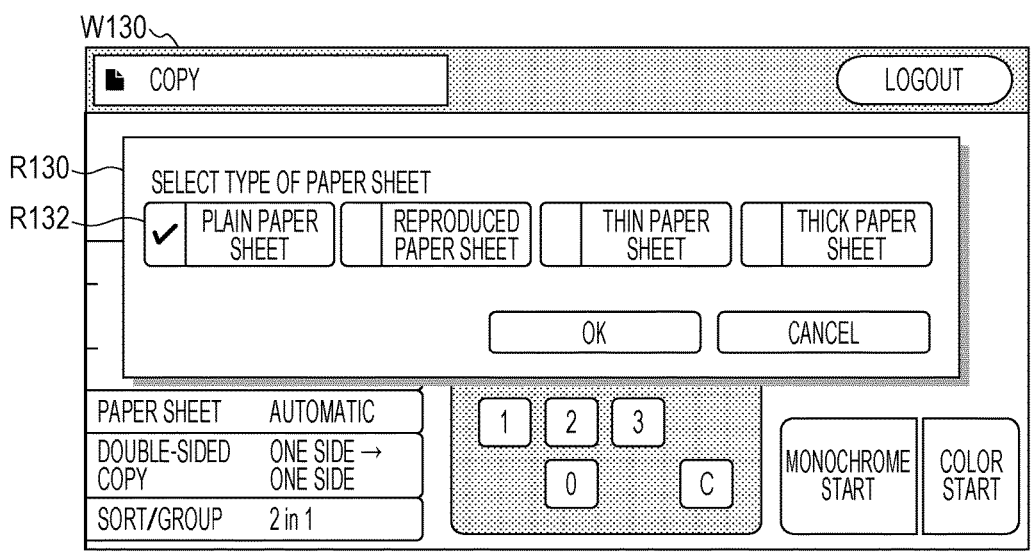
FIG. 9 is a view for describing an operation example of a screen based on display screen information according to the first embodiment.

In addition, FIG. 9 illustrates an example of a display screen W130 indicating a case in the middle of various settings. In FIG. 9, various items, such as a window for various settings, a working region, setting information, and the like are displayed.

On the display screen W130, a paper sheet setting screen R130 is displayed, and among types of the paper sheets, "plain paper sheet" is selected in R132. The "plain paper sheet" may be set as a printing condition, or may not be set as a printing condition.

In FIG. 9, the screen displayed on the display screen W130 is saved as the display screen information when unintended logout is made. Therefore, at the time of login (when returning from the user), the display screen W130 of FIG. 9 is displayed.

In addition, in the embodiment, the image data of the document placed on the document reading section 122 is stored as the state determination information 186, but data other than the image data may be stored as long as the data is data indicating the presence or absence of a change in the placed state of the document. For example, a flag indicating whether or not the document is placed may be stored. In other words, in a case where the truth and false value at the time of logout and the truth and false value when the user logs in again are different from each other while a state where the document is placed is true and a state where the document is not placed is false, it may be determined that the state has changed. Otherwise, the document reading section 122 is monitored from the time of the logout to the time when the user logs in again, and a true and false value that is true when the state of the document reading section 122 has changed and false in other cases is stored, and in step S1010, it may be determined that the placed state of the document when the true and false value is true has changed.

As described above, according to the embodiment, when there is no change in the placed state of the document when the user logs in again after the user is unintentionally logged out, based on the print setting information or the display screen information, it becomes possible to return the printing conditions or the display screen. Therefore, it is possible to change the state after the user logs in again in a form close to a user case.

In addition, the return related to the print setting information or the display screen information may be selectable. For example, the printing conditions return based on the print setting information, but an operation in which the display screen is set to the initial screen (for example, FIG. 6) may be performed.

2. Second Embodiment

Subsequently, a second embodiment will be described. Unlike the first embodiment, the second embodiment is an embodiment in which the document reading section 122 reads an image stored in the storage medium. In this case, the document reading section 122 is, for example, a USB interface, a card reader, an optical drive or the like, and the storage medium that stores the image is mounted or inserted.

Therefore, the state determination information 186 in the embodiment stores not the state of the document placed on the document table, but the state of the storage medium mounted (exists) in the document reading section 122. In the second embodiment, the functional configuration and processing of the first embodiment are substantially the same as those of the second embodiment, description thereof will be omitted, and the contents different from those of the first embodiment will be mainly described.

Unlike FIG. 2, the functional configuration of the embodiment has a media reading section connected to the input section 120. The media reading section is a functional section that reads the image data from the storage medium, such as a mounted USE memory, a semiconductor storage device (for example, compact flash (registered trademark)), or an optical disk device (for example, CD-R or Blu-ray Disc), and inputs the data into the input section 120.

Figure 10:
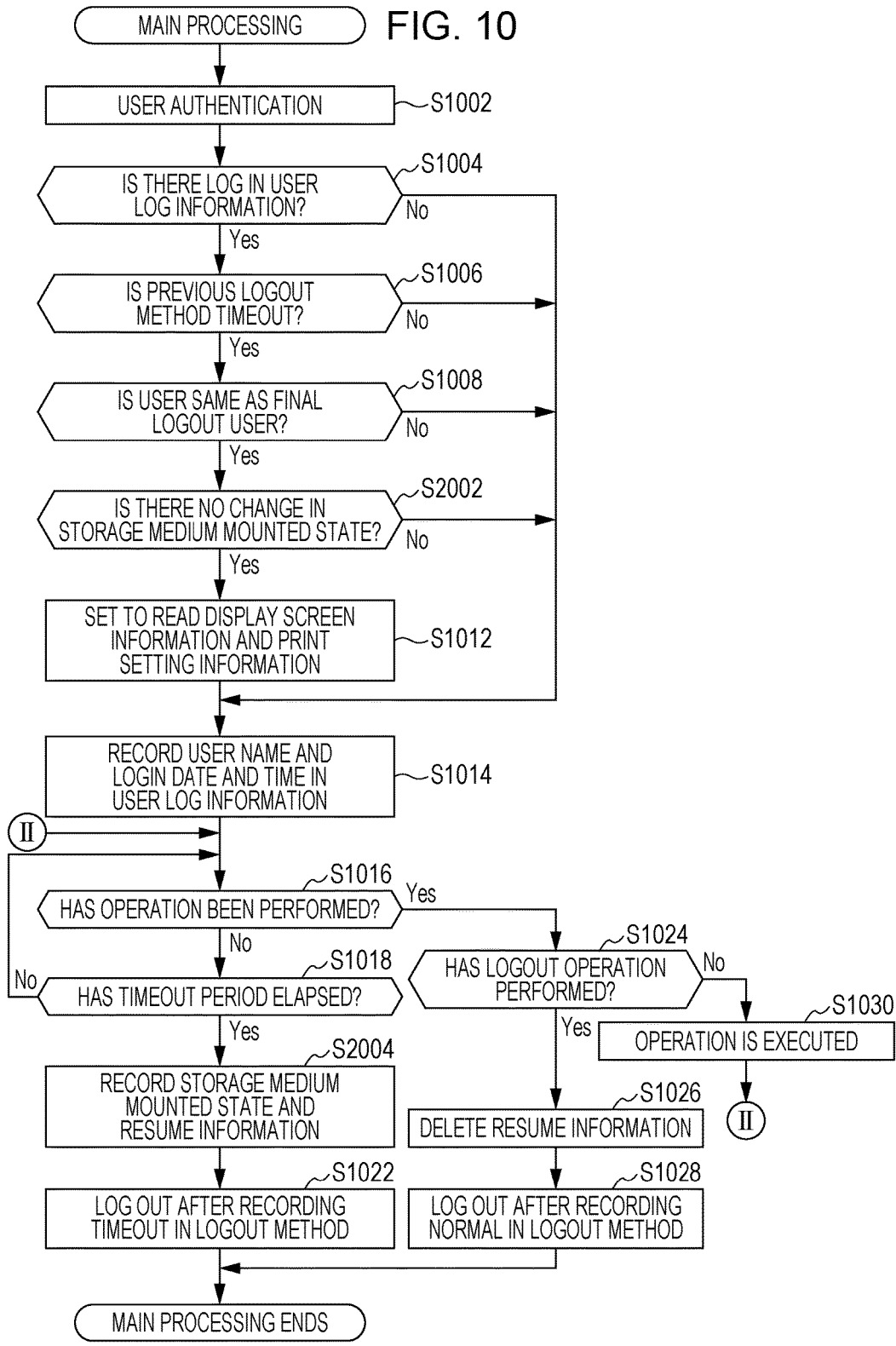
FIG. 10 is an operation flow for describing main processing according to a second embodiment.

The main processing of the embodiment will be described with reference to FIG. 10. The processing with the same reference numerals as those in FIG. 5 is the same as the processing with the same reference numerals in FIG. 5. In a case where the determination in step S1008 is affirmative, then it is determined whether or not a storage medium mounted state has changed from the previous logout time (step S1008; Yes→step S2002).

The storage medium mounted state is a state related to the storage medium mounted on the document reading section 122, that whether or not the storage medium exists by being mounted on the document reading section 122, and what kind of storage medium exists in a case where the storage medium exists. The determination as to whether or not there is a change in the state (storage medium mounted state) where the storage medium is mounted from the previous logout time is performed based on the state determination information 186.

In the embodiment, it may be detected that the storage medium is removed, or the determination may be performed using identification information (for example, serial number) of the storage medium in a case where the storage medium is mounted. In a case where the serial number is used, the serial number is stored as the state determination information 186. In step S2002, the serial number of the mounted storage medium is read, and a serial number and the serial number stored in the state determination information 186 are compared with each other. As a result of the comparison, in a case where both serial numbers match each other, it is determined that there is no change in the storage medium mounted state.

Further, in a case of logging out due to timeout, the storage medium mounted state is stored as state determination information 186 (step S2004).

In addition, in the embodiment, the serial number of the storage medium is stored as the state determination information 186, but the data other than the serial number may be stored as long as the data is data indicating the presence or absence of a change in the storage medium mounted state. For example, the file configuration of the storage medium, the path of the file referred to at the time of logout, the time stamp, the contents of the file, the hash digest of the file, and the like may be stored.

In addition, in a case where it is detected that the storage medium has been removed, the information indicating that the state of the storage medium has changed is stored in the state determination information 186. Accordingly, it is possible to determine a change in the mounted state of the storage medium.

3. Third Embodiment

Subsequently, a third embodiment will be described. Unlike the first embodiment, the third embodiment is an embodiment in which the state determination information 186 stores not the placed state of the document placed on the document table but the state of the manual feed tray. In the third embodiment, the functional configuration and processing of the first embodiment are substantially the same as those of the first embodiment, description thereof will be omitted, and the contents different from those of the first embodiment will be mainly described.

Unlike FIG. 2, the functional configuration of the embodiment is provided with the manual feed tray that can detect the presence or absence of a paper sheet (recording medium) in the image forming section 130.

Figure 11:
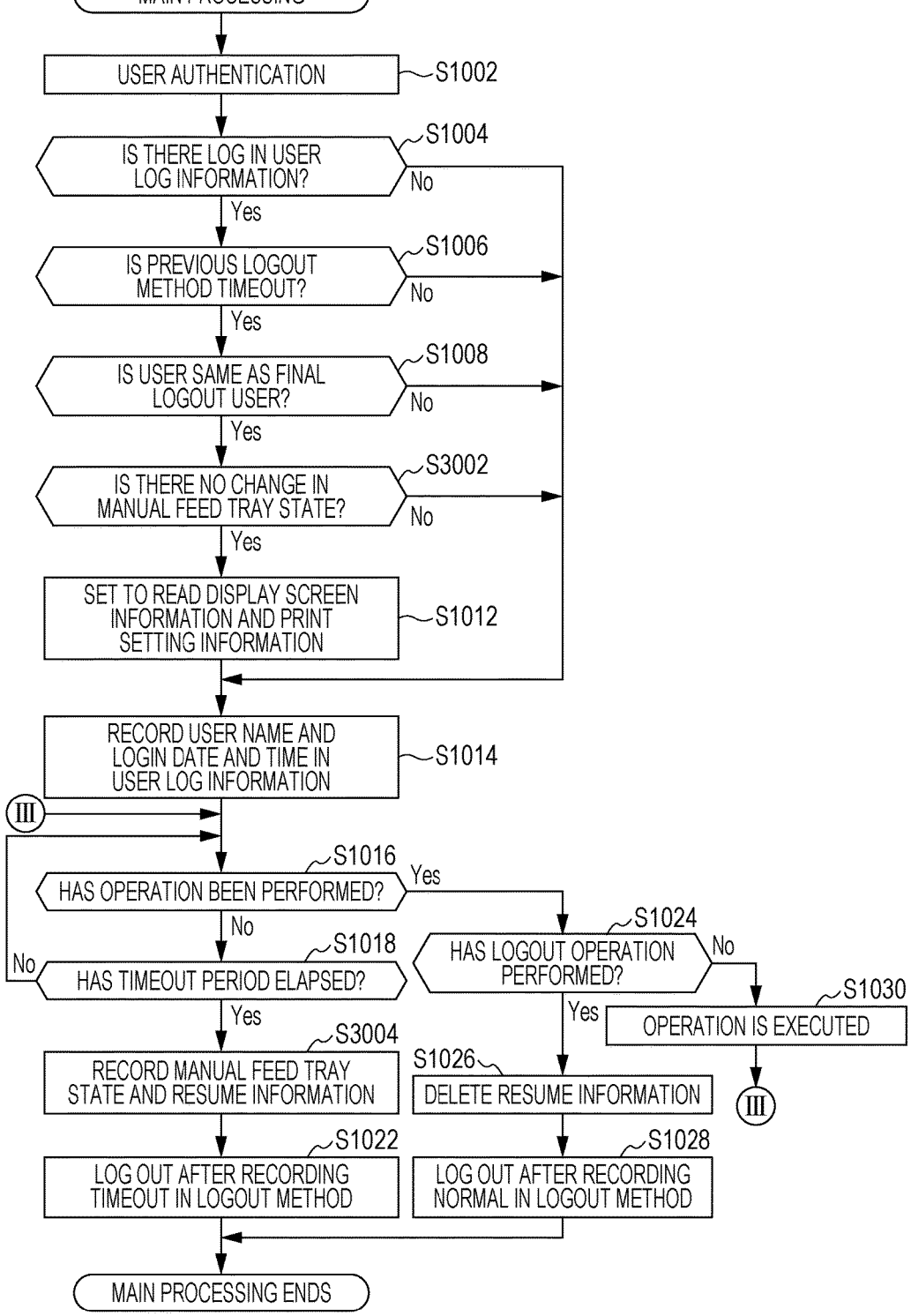
FIG. 11 is an operation flow for describing main processing according to a third embodiment.

The main processing of the embodiment will be described with reference to FIG. 11. The processing with the same reference numerals as those in FIG. 5 is the same as the processing with the same reference numerals in FIG. 5. In a case where the determination in step S1008 is affirmative, then it is determined whether or not the manual feed tray state has changed from the previous logout time (step S1008; Yes→step S3002).

The manual feed tray state refers to a state whether or not the manual feed tray is open or whether or not the paper sheet placed on the manual feed tray exists. Determination as to whether or not there is no change in the manual feed tray state from the previous logout time is performed based on the state determination information 186.

In the embodiment, information on whether or not the manual feed tray is open and information on whether or not the paper sheet is placed on the manual feed tray are stored in the state determination information 186. In step S3002, the manual feed tray state is read, and the manual feed tray state and the manual feed tray state stored in the state determination information 186 are compared with each other. As a result of the comparison, in a case where the states of both manual feed trays match each other, it is determined that there is no change in the state of the manual feed tray.

Further, in a case of the logout due to timeout, the manual feed tray state is stored as state determination information 186 (step S3004).

4. Fourth Embodiment

Subsequently, a fourth embodiment will be described. The fourth embodiment is an embodiment in which the functional section of a person detecting sensor and the determination by the person detecting sensor are added to the first embodiment. In the embodiment, a case of reading the display screen information and the print setting information, is a case where there is no change in the state around the image forming apparatus 10.

Specifically, the user name of the authenticated user matches the final logout user name, and the previous logout method of the user is timeout. In addition, in a case where there is no change in the state of the image forming apparatus 10 and the user continues to stay around the image forming apparatus 10 from the time of logout until the user logs in again, it is determined that the surrounding state has not changed.

Figure 12:
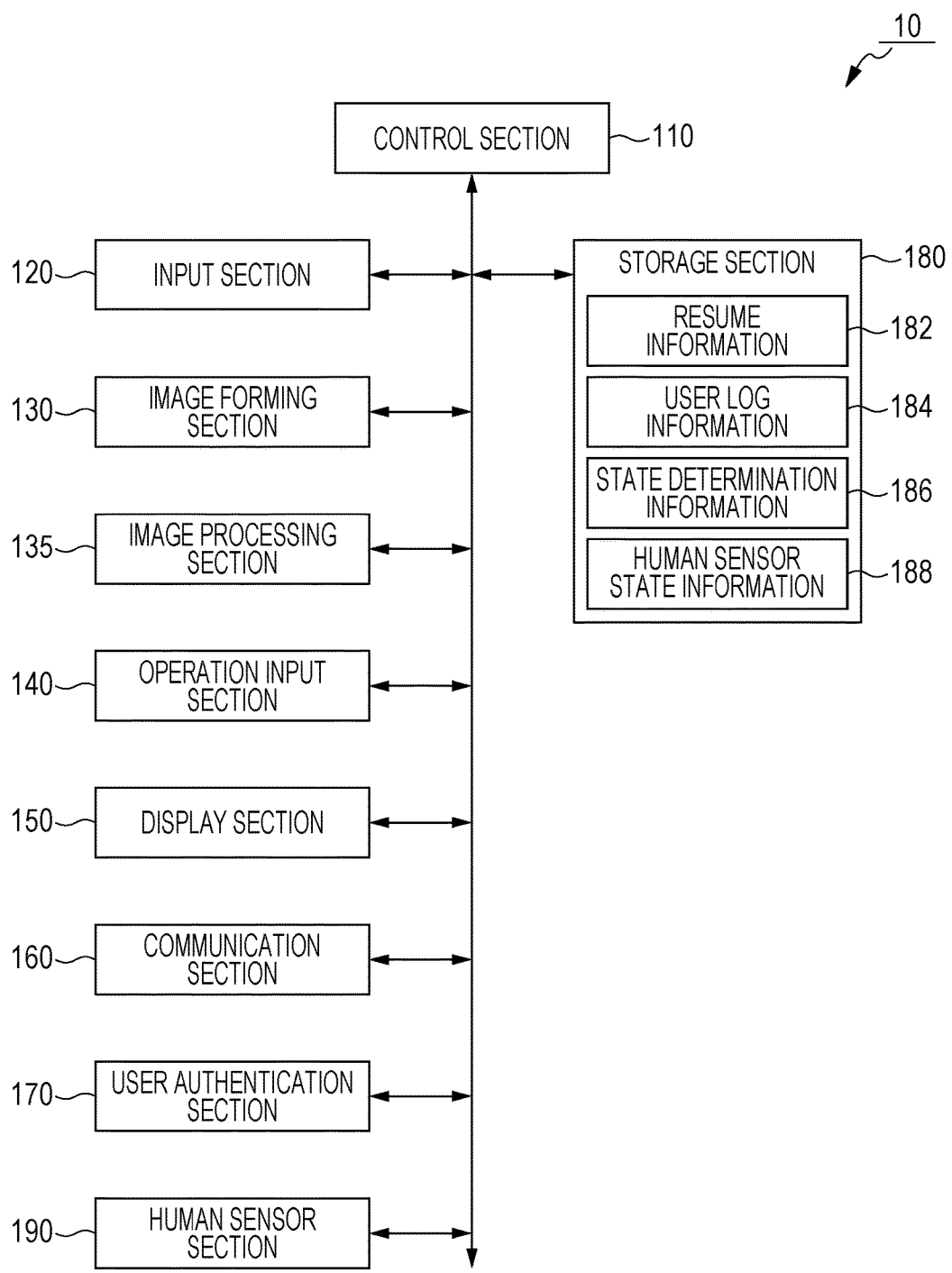
FIG. 12 is a view for describing a functional configuration of an image forming apparatus according to a fourth embodiment.

The functional configuration of the embodiment is obtained by replacing FIG. 2 of the first embodiment with FIG. 12. The functional section with the same reference numerals as those in FIG. 2 is the same as the functional section with the same reference numerals in FIG. 2. In addition, although not illustrated in the drawing, the functional section connected to the input section 120 may be the document reading section 122, may be the media reading section, or may be both.

The resume information 182, the user log information 184, the state determination information 186, and person detecting sensor state information 188 are stored in the storage section 180 of the embodiment. Further, a person detecting sensor section 190 for detecting a person who exists around the image forming apparatus 10 is also included.

The person detecting sensor state information 188 is information used for determining whether or not the surrounding states of the image forming apparatus 10 match each other at the time when the user logs out and the time when the user logs in. In the embodiment, any of whether or not there is a change in the surrounding state the image forming apparatus 10 from the time of logout to the time of logout again is stored.

Figure 13:
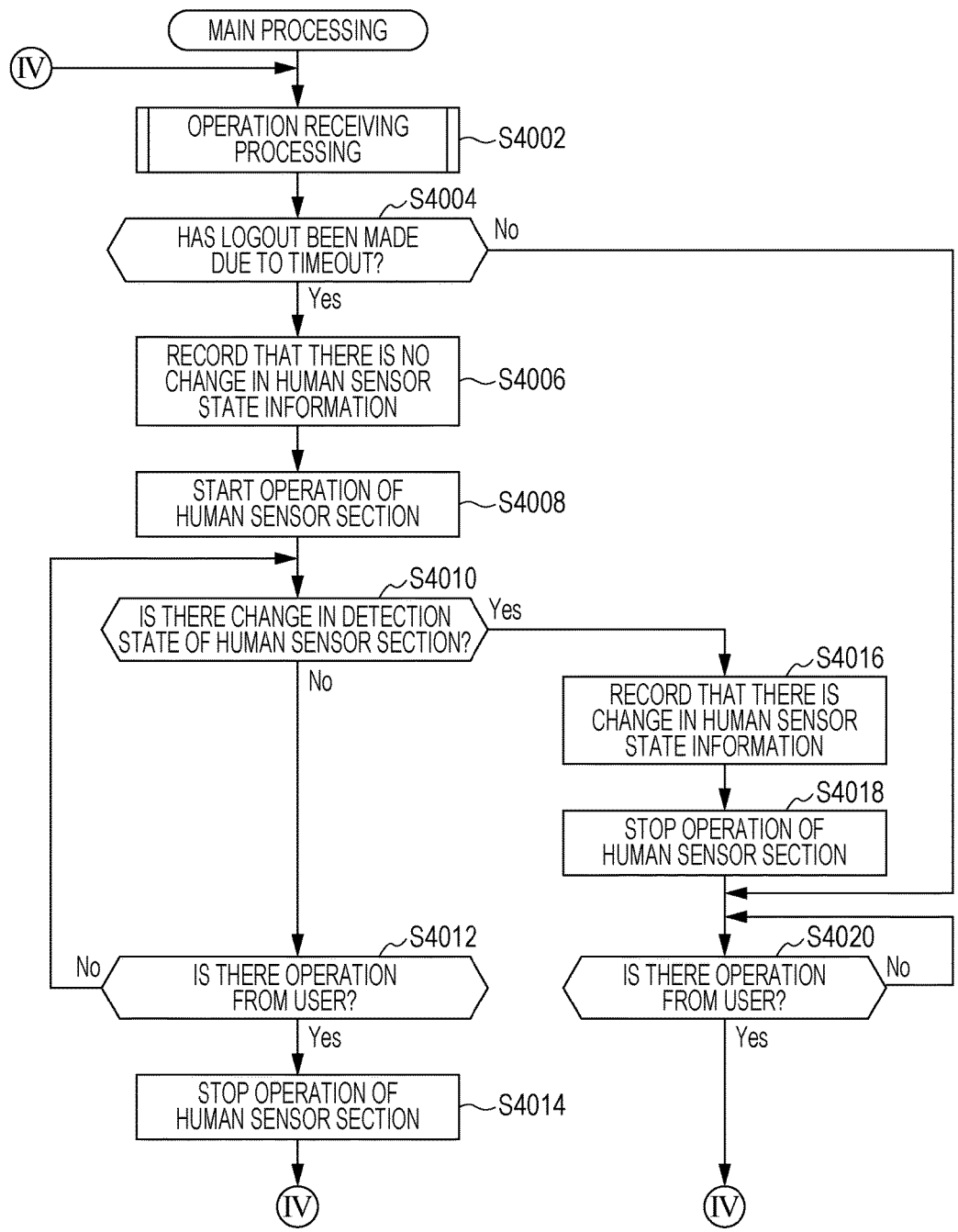
FIG. 13 is an operation flow for describing main processing according to the fourth embodiment.
Figure 14:
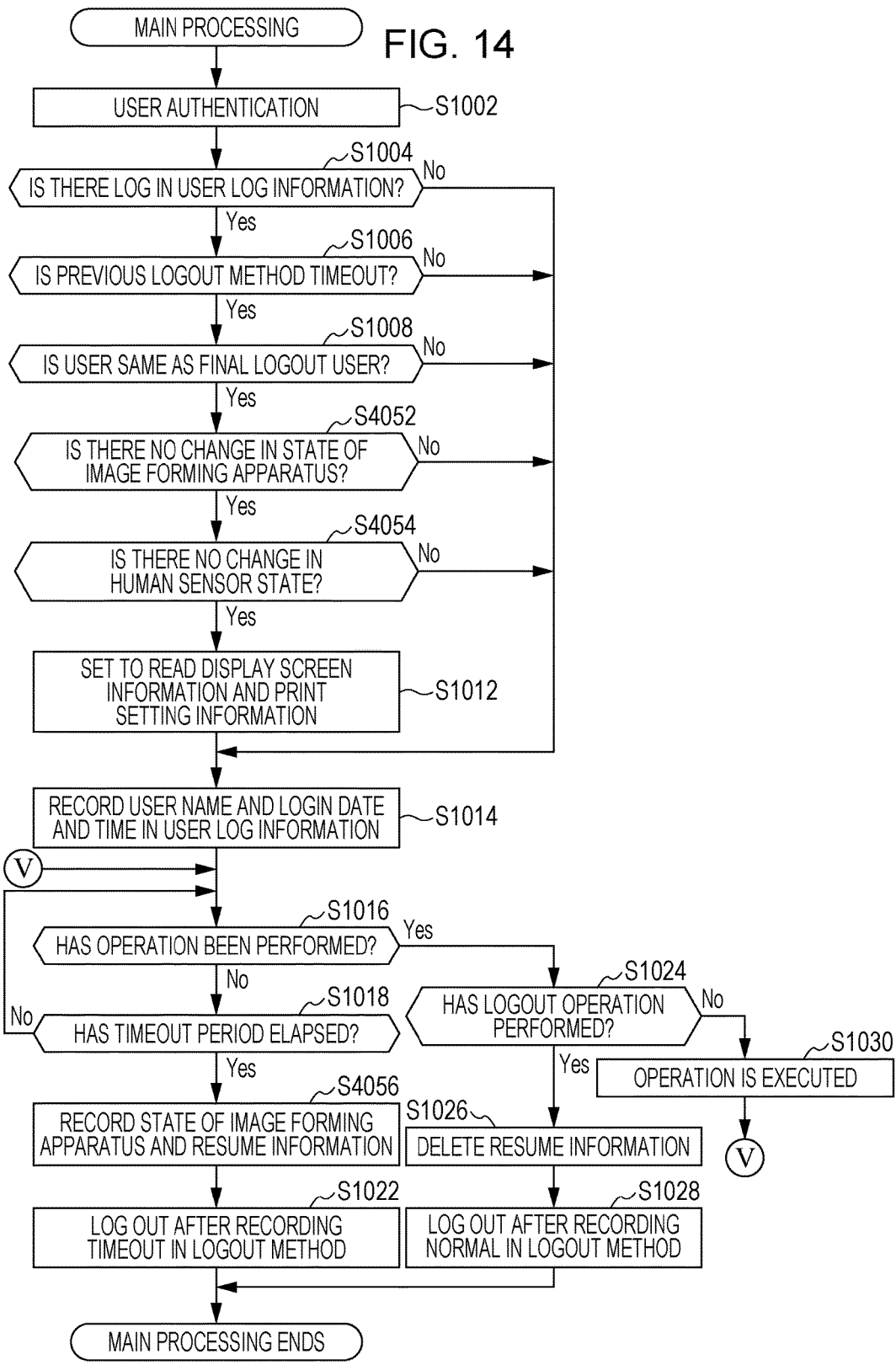
FIG. 14 is a view for describing an operation example of operation receiving processing according to the fourth embodiment.

The main processing of the embodiment is the same as that of FIG. 5 of the first embodiment with FIGS. 13 and 14. The processing with the same reference numerals as those in FIG. 5 is the same as the processing with the same reference numerals in FIG. 5.

First, operation receiving processing is performed (step S4002). The operation receiving processing is processing executed when the image forming apparatus 10 receives an operation from the user and is processing for exerting a function as an image forming apparatus. In addition, the operation receiving processing ends by the logout. Details will be described later.

Subsequently, in the operation receiving processing (step S4002), it is determined whether or not the logout is made due to timeout (step S4004). In a case where it is determined that the logout is made due to timeout, it is stored that there is no chance in the person detecting sensor state (step S4004; Yes→step S4006). Subsequently, the operation of the person detecting sensor section 190 is started, and a change in a surrounding state of the image forming apparatus 10 is monitored (step S4008).

Subsequently, it is determined whether or not there is a change in the detection state of the person detecting sensor section 190 (step S4010). A case where there is a change in the detection state of the person detecting sensor section 190 is, for example, a case where the person detecting sensor section 190 detects that the user who exists around the image forming apparatus 10 has left the surrounding of the image forming apparatus 10 at the time of logout.

In a case where there is no change in the detection state of the person detecting sensor section 190, then, it is determined whether or not there is an operation from the user (step S4010; No→step S4012). When there is no operation from the user, the process returns to step S4010 (step S4012; No). When there is an operation from the user, the operation of the person detecting sensor section 190 is stopped (step S4012; Yes→step S4014) and the operation receiving processing is performed.

In a case where there is a change in the detection state of the person detecting sensor section 190, it is stored that there is a change in the person detecting sensor state information 188 (step S4010; Yes→step S4016). Subsequently, the operation of the person detecting sensor section 190 is stopped (step S4018), and it is determined whether or not there is an operation from the user (step S4020).

When there is an operation from the user, the operation receiving processing is performed (step S4020; Yes). When there is no operation, the determination of the presence or absence of the operation by the user is repeated until there is an operation (step S4020; No). In other words, in a case where there is a change in the detection state of the person detecting sensor section, it is determined only whether or not there is the operation from the user regardless of a chance in the surrounding state of the image forming apparatus 10 thereafter.

In step S4004, in a case where it is not determined that the logout is made due to timeout, the operation of the person detecting sensor section 190 is not started, and it is determined only whether or not there is an operation from the user (step S4004; No→step S4020).

The operation receiving processing will be described with reference to FIG. 14. In a case where the determination in step S1008 is affirmative, then it is determined whether or not the state of the image forming apparatus 10 has changed from the previous logout time (step S1008; Yes→step S4052). In other words, whether or not the states of a specific functional section outside the image forming section 130 match each other at the time when the user logs out and the time when the user logs in is determined by using the state determination information 186. Determination of the state of which functional section depends on the functional section (for example, the document reading section and a manual feed tray section) connected to the input section 120 or the image forming section 130.

In a case where there is no change in the state of the image forming apparatus 10, it is subsequently determined whether or not there is a change in the person detecting sensor state (step S4052; Yes→step S4054). In the embodiment, since the presence or absence of the change in the person detecting sensor is stored in the person detecting sensor state information 188, the determination may be performed based on the person detecting sensor state information 188.

In a case of the logout due to timeout, in step S4052, in order to compare the state of the image forming apparatus 10, the state of the functional section which is a comparison target is stored as the state determination information 186 (step S4056).

5. Fifth Embodiment

Subsequently, a fifth embodiment will be described. The fifth embodiment is the same as the first embodiment, in configuration, but is an embodiment in which the user is asked to select whether to return when the screen returns based on the display screen information and the print setting information.

Figure 15:
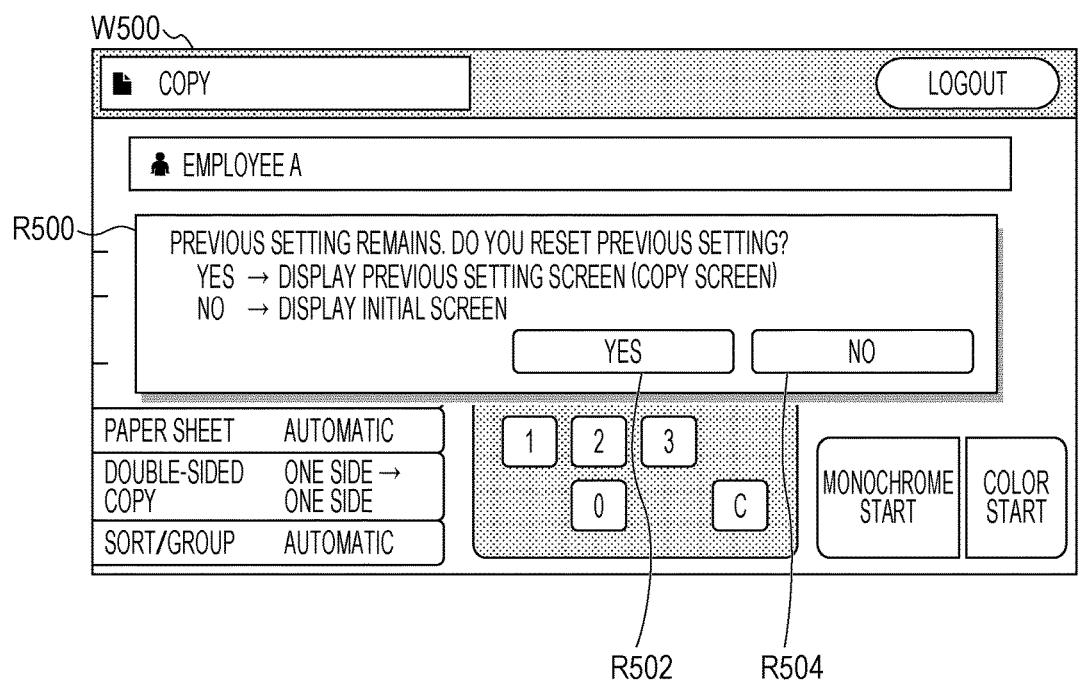
FIG. 15 is a view for describing an operation example of a return screen according to a fifth embodiment.

FIG. 15 illustrates an example of a display screen W500 for making an inquiry to the user. On the display screen W500, a dialog box region R500 for allowing the user to select whether to display the screen based on the display screen information and the print setting information is displayed. In addition, a button R502 for returning the screen based on the display screen information and the print setting information and a button R504 for displaying the initial screen are displayed on the dialog box region R500. By the selection of the user (for example, touch operation), a screen is displayed on the display section 150 based on the selection.

In addition, a case where the dialog box is used to select the screen to be displayed to the user has been described, but as lone as the same processing can be realized, the disclosure may be realized by an appropriate method. For example, a dedicated screen may be displayed instead of a dialog, or a screen at the time of the previous logout can be displayed by an icon or the like on a part of the display section 150, and by operating the icon or the like, the screen at the previous logout may be displayed.

In addition to the above-described options, the return related to print setting information or the display screen information may be selectable. For example, based on the display screen information, the display screen returns, but it may be possible to select an operation to set the print setting to the initial state.

6. Sixth Embodiment

Subsequently, a sixth embodiment will be described. The sixth embodiment is the same as the first embodiment in configuration, but in a case where the operation is completed, the embodiment is an embodiment in which the previous logout screen is not displayed.

A case where the operation is completed, for example, is a case where the image forming apparatus 10 exerts a function as an image forming apparatus based on the setting performed with respect to the image forming apparatus 10, such as a case where the copy function of the image forming apparatus 10 is operated by pressing the copy start button (button displayed on R126 of FIG. 8). In this case, since the function based on the setting has already been exerted, after the logout, the setting is not used again when the user logs in again.

For example, a flag indicating whether or not the operation is completed is stored in the storage section 180, and after the user authentication is per again, before reading the display screen information and the print setting information, by the flag, in a case where it is determined that the operation is completed, the operation of reading the display screen information and the print setting information may be performed. Further, in step S1014, a flag as to whether or not the operation is completed determines whether or not the operation by the user is to cause the function as the image forming apparatus to be exhibited, and the result may be stored in the storage section 180.

In addition, in the storage section 180, even when the flag is other than the flag, as long as the information is information that can be determined whether or not the operation is completed, appropriate information may be stored. For example, what kind of operation is performed in step 11014 may be stored in the storage section 180, and when the user logs in again, it may be determined whether or not the stored operation was an operation to exert the function as the image forming apparatus.

7. Effects

According to the above-described embodiment, since the screen displayed based on the display screen information and the print setting information stored in the storage section 180 when the user logs in again in a case of intended logout is not made, there is no need for a troublesome operation for returning to the state before the logout. Accordingly, the work in a state close to the user case can be started, and convenience can be enhanced.

Further, regarding the correspondence to a case where it is desired to correct the setting from the initial screen, by inquiring of the user or by determining whether or not the user has left the image forming apparatus 10, it is possible to take the intention of the user into consideration, and to expect further improvement of convenience.

8. Modified Example

Above, although the embodiments of the disclosure have been described in detail with reference to the drawings, the specific configuration is not limited to the embodiment, and designs and the like within the scope not departing from the gist of the disclosure are included.

Further, it is needless to say that the above-described embodiments can be executed in combination of each of the embodiments. For example, by executing the first embodiment, the second embodiment, and the third embodiment in combination, it is possible to determine the presence or absence of a change in the state of the image forming apparatus 10 from the state of a plurality of functional sections. Further, by combining the embodiment with the fourth embodiment, it is possible to make the embodiment further utilizing the person detecting sensor, or by combining the embodiment with the fifth embodiment, it is possible to perform the return in a case where the operator selects the return.

In addition, in the embodiment, a program for operating on each device is a program (a program for causing a computer to function) for controlling the CPU or the like so as to realize the functions of the above-described embodiments. In addition, information handled by the devices is temporarily stored in a temporary storage device (for example, RAM) at the time of processing, and thereafter is stored in a storage device, such as an HDD or a solid state drive (SSD), and in a case of necessity, the reading is performed by the CPU and correction and writing are performed.

In addition, in a case of distribution to the market, the program can be stored in a portable storage medium and distributed, or transferred to a server computer connected via a network, such as the Internet. In this case, it is needless to say that the storage device of the server computer is also included in the disclosure.

The present disclosure contains subject matter related to that disclosed in Japanese Priority Patent Application JP 2017-109343 filed in the Japan Patent Office on Jun. 1, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus having an image forming section that forms an image on a recording medium based on printing conditions, the apparatus comprising:
    state determination circuitry configured to determine a state of the image forming apparatus;
    authentication circuitry configured to authenticate a user and permit login of the user to the image forming apparatus;
    operation display circuitry configured to receive, via an operation screen, setting associated with the printing conditions from the user;
    storage circuitry configured to store the printing conditions and a state of the operation screen in a case where the user is logged out from the image forming apparatus without performing a logout operation by the user; and
    returning circuitry configured to read out the printing conditions and the state of the operation screen stored in the storage unit, and
    return the image forming apparatus to the state at the time of logout in a case where the user is logged out without performing the logout operation and the state determination circuitry determines that a current state of the image forming apparatus is the same as the state of the image forming apparatus at the time of logout, when the authentication unit permits the login of the user, and
    initialize the state of the image forming apparatus in a case where the user is logged out without performing the logout operation and the state determination circuitry determines that a current state of the image forming apparatus is different than the state of the image forming apparatus at the time of logout, when the authentication unit permits the login of the user.

2. The image forming apparatus according to claim 1, further comprising:
    document reading circuitry configured to read a placed document and outputs the read document as the image,
    wherein the state determination circuitry determines that the current state of the image forming apparatus is the same as the state of the image forming apparatus at the time of logout by comparing a current state of the placed document with a state of the placed document at the time of logout.

3. The image forming apparatus according to claim 1, further comprising:
    an image reading-out circuitry configured to read out an image stored in a storage medium,
    wherein the state determination circuitry determines that the current state of the image forming apparatus is the same as the state of the image forming apparatus at the time of logout by comparing a current storage medium mounted state with a storage medium mounted state at the time of logout.

4. The image forming apparatus according to claim 1, further comprising:
    a manual feed tray for setting the recording medium,
    wherein the state determination circuitry determines that the current state of the image forming apparatus is the same as the state of the image forming apparatus at the time of logout by comparing a current state of the manual feed tray with a state of the manual feed tray at the time of logout.

5. The image forming apparatus according to claim 1, further comprising:
    a person detecting sensor that detects presence or absence of an operator for the image forming apparatus,
    wherein the returning circuitry further reads out the printing conditions and the state of the operation screen stored in the storage unit and returns to the state at the time of the logout, in a case where the person detecting sensor detects that there is no change in the operator.

6. The image forming apparatus according to claim 1,
    wherein the returning unit reads out the printing conditions and the state of the operation screen stored in the storage circuitry and returns the image forming apparatus to the state at the time of the logout, in a case where an operation for the returning is performed by the user.

7. A non-transitory machine-readable medium storing a program executable by one or more processors of an image forming apparatus that forms an image on a recording medium based on printing conditions, the program comprising:
    a state determining function of determining a state of the image forming apparatus;
    an authenticating function of authenticating a user and permitting login of the user to the image forming apparatus;
    an operation display function of displaying an operation screen that receives setting associated with the printing conditions by the user;
    a storage function of storing the printing conditions and a state of the operation screen in a case where the user is logged out from the image forming apparatus without performing a logout operation by the user; and
    a returning function of reading out the printing conditions and the state of the operation screen stored by the storage function, and
    returning the image forming apparatus to the state at the time of logout in a case where the user is logged out without performing the logout operation and it is determined by the state determining function that a current state of the image forming apparatus is the same as the state of the image forming apparatus at the time of logout, when the authenticating function permits the login of the user, and initializing the state of the image forming apparatus in a case where the user is logged out without performing the logout operation and the state determination circuitry determines that a current state of the image forming apparatus is different than the state of the image forming apparatus at the time of logout, when the authentication unit permits the login of the user.

* * * * *